A. HAMM & K. DÜRR.
CHAIN MAKING APPARATUS.
APPLICATION FILED SEPT. 14, 1912.
1,053,726.
Patented Feb. 18, 1913.
6 SHEETS—SHEET 1.
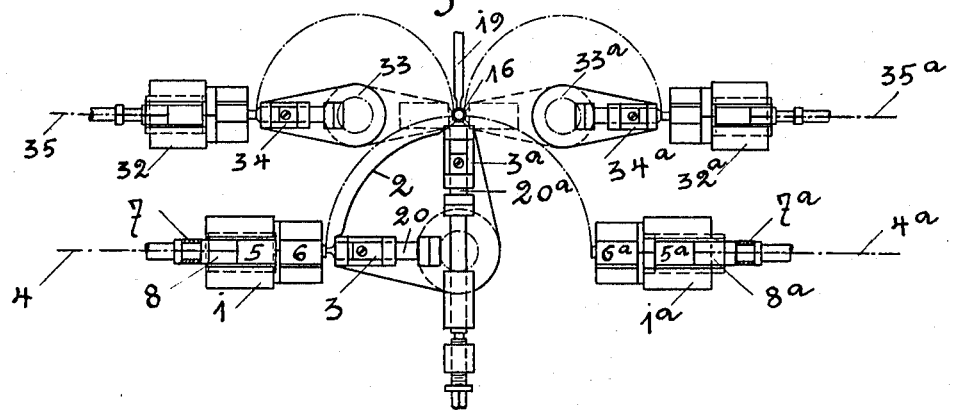
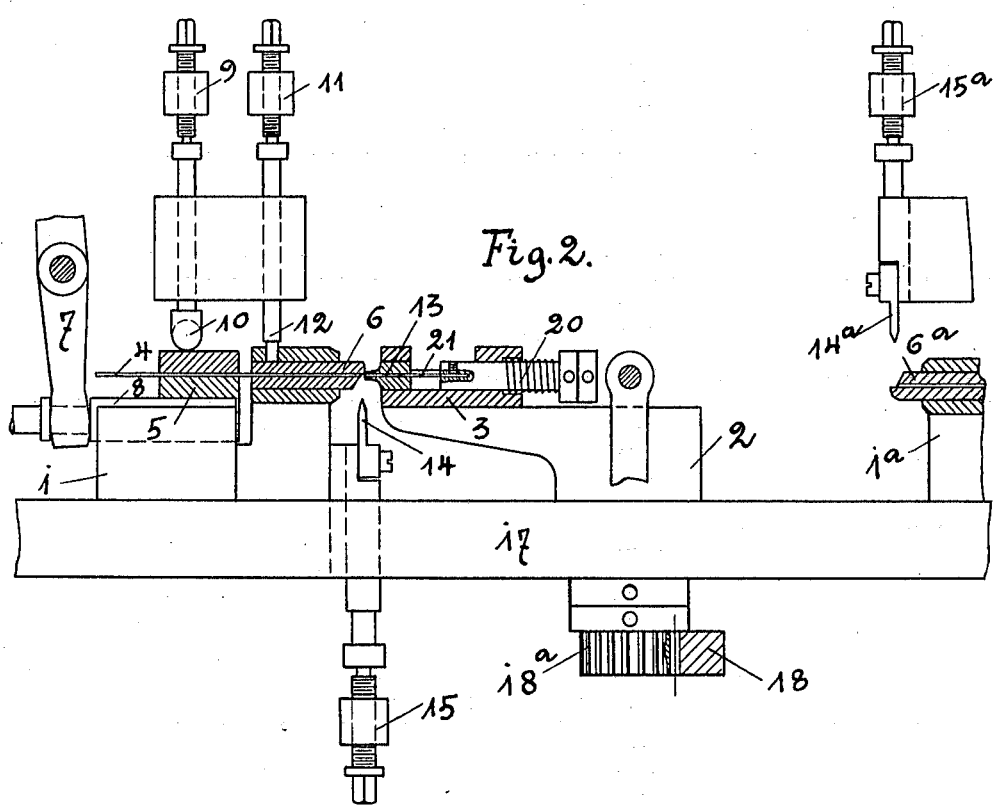

A. HAMM & K. DÜRR.
CHAIN MAKING APPARATUS.
APPLICATION FILED SEPT. 14, 1912.
1,053,726.
Patented Feb. 18, 1913.
6 SHEETS—SHEET 2.
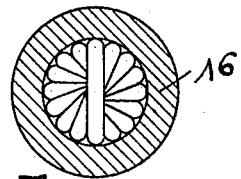
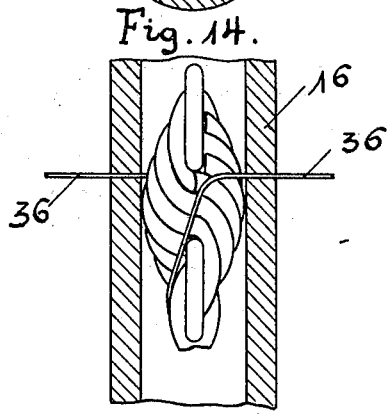
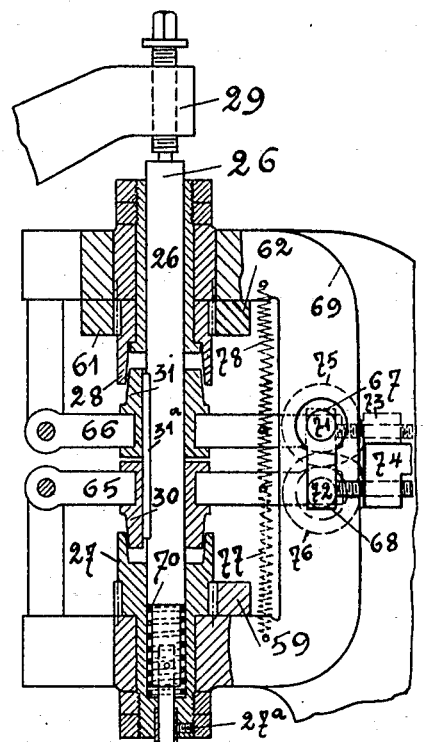
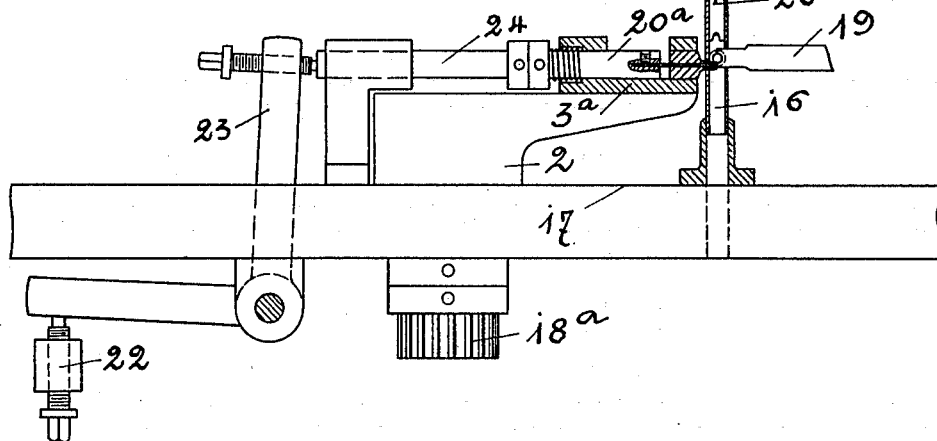
Witnesses
Inventors
Albert Hamm and Karl Dürr

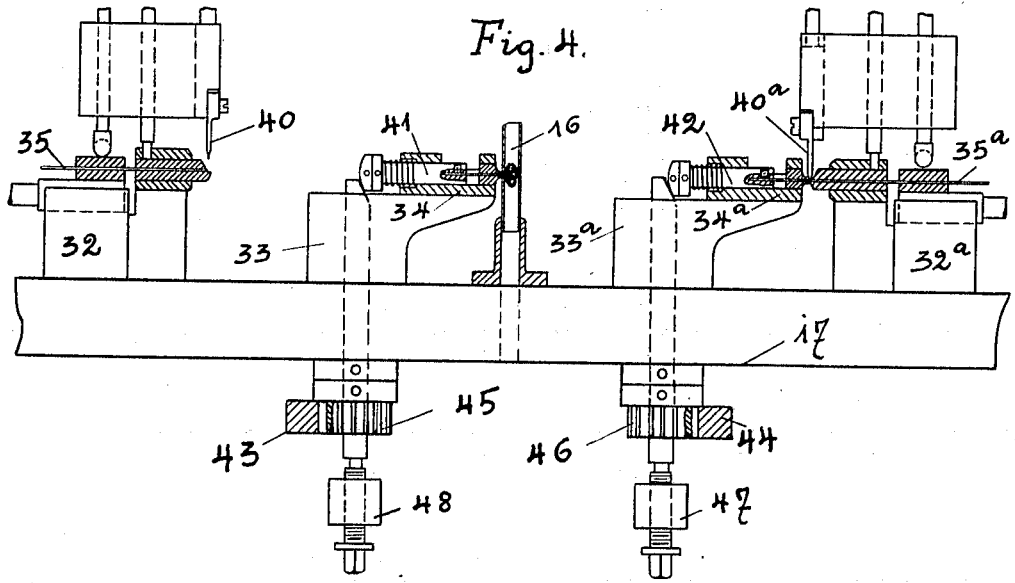

A. HAMM & K. DÜRR.
CHAIN MAKING APPARATUS.
APPLICATION FILED SEPT. 14, 1912.
1,053,726.
Patented Feb. 18, 1913.
6 SHEETS—SHEET 4.
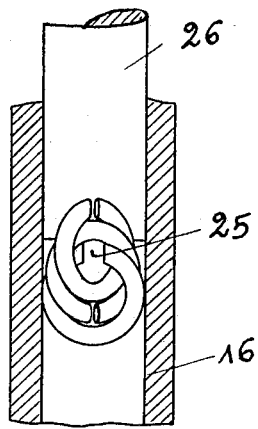
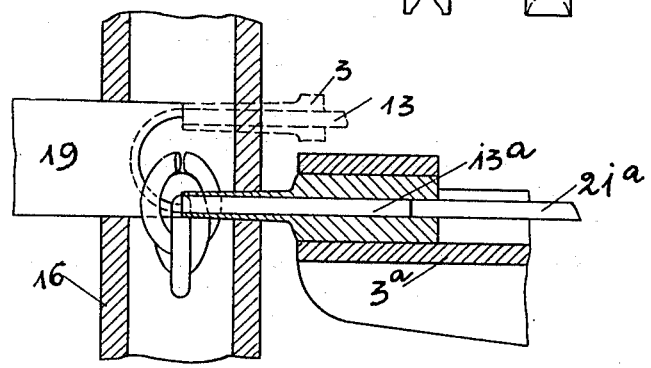
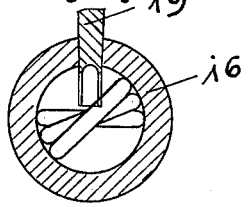
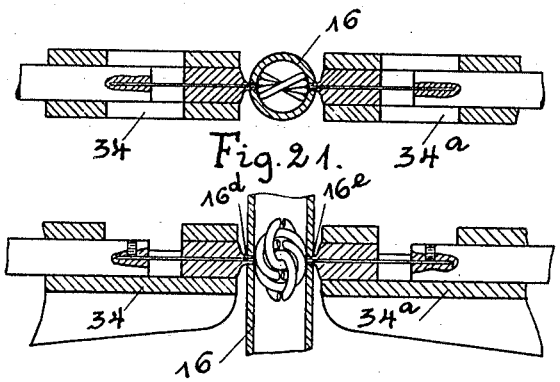
Witnesses
Inventors
Albert Hamm, Karl Dürr,

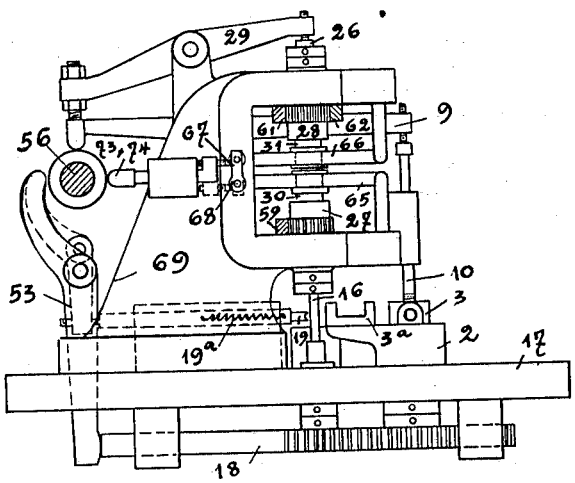

A. HAMM & K. DÜRR.
CHAIN MAKING APPARATUS.
APPLICATION FILED SEPT. 14, 1912.

1,053,726.

Patented Feb. 18, 1913.
6 SHEETS—SHEET 6.

Witnesses

Inventors

UNITED STATES PATENT OFFICE.

ALBERT HAMM AND KARL DÜRR, OF PFORZHEIM, GERMANY.

CHAIN-MAKING APPARATUS.

1,053,726.  Specification of Letters Patent.  Patented Feb. 18, 1913.

Application filed September 14, 1912. Serial No. 720,409.

*To all whom it may concern:*

Be it known that we, ALBERT HAMM and KARL DÜRR, subjects of the German Emperor, both residing at Pforzheim, in Germany, have invented a certain new and useful Improvement in Chain-Making Apparatus, of which the following is a specification.

The object of this invention is to provide improved apparatus for making so-called cord or rope chains.

The invention is illustrated in the accompanying drawing, in which—

Figure 25:
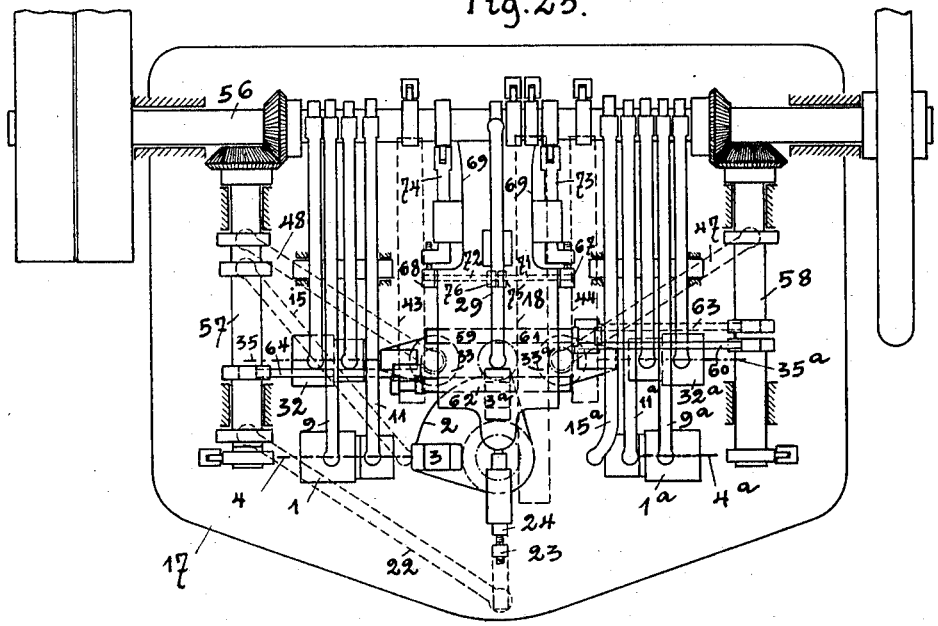
Figure 26:
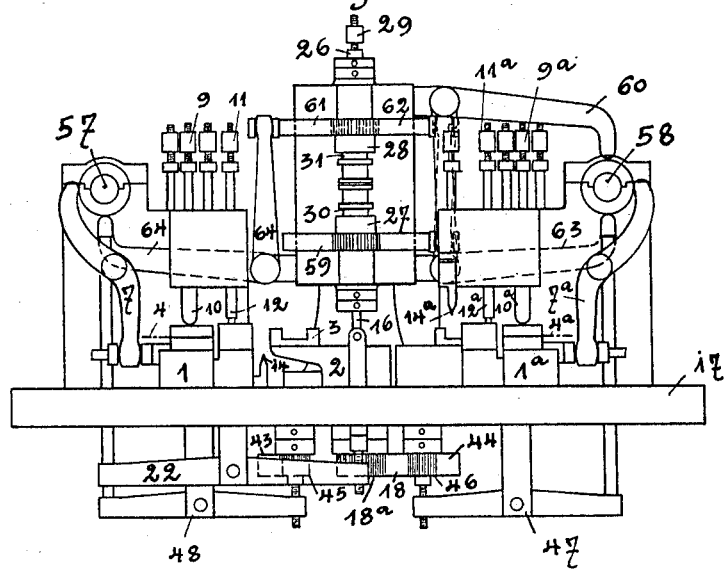

Figure 1 is a plan view of the apparatus, with parts omitted for clearness. Fig. 2 is an elevation of part of the feed and cutting apparatus, drawn to a larger scale, and partly in section. Fig. 3 is an elevation, partly in section, of the link forming device. Fig. 4 is an elevation, partly in section, of apparatus for applying solder to the links. Figs. 5 and 6 are sectional plan views of details of the link forming device, and Figs. 7 and 8 are corresponding vertical sections. Figs. 9 and 10 are elevations of portions of the link forming device. Figs. 11 and 12 represent links formed in the machine. Fig. 13 is a horizontal section and Fig. 14 is a vertical section, of a tubular guide in which the chain is formed. Figs. 15 and 16 are vertical sections, and Fig. 17 is a horizontal section, illustrating the formation of a chain in the said tubular guide. Figs. 18 and 19 show the appliance for advancing the chain in the guide in which it is formed. Fig. 20 is a horizontal section, and Fig. 21 a vertical section, of the solder-inserting device. Fig. 22 illustrates a modification of the link-forming mechanism, Fig. 23 being a detail view, showing the parts in another position, and Fig. 24 being a view from the left-hand side of Fig. 22, with the lever 23 removed. Fig. 25 is a plan view of the machine, Fig. 26 a front elevation, and Fig. 27 a side elevation.

In the drawing, 2 designates a rotatable support, toward which wires 4 and $4^a$ are fed by means of feed devices 1, $1^a$, the said wires passing through clamps 5, 6 and $5^a$, $6^a$ respectively, placed in line with each other at opposite sides of the support 2. The two feed devices 1 and $1^a$ are alike, and are actuated by means of levers 7 and $7^a$ respectively. The action thereof will now be described with reference to the feed device 1, best shown in Fig. 2.

The clamp 5 is mounted on a carriage 8, which is reciprocated by the lever 7. A presser 10 actuated by a lever 9 acts on this clamp 5 during the forward feed of the wire, so that the wire is held fast by the said clamp while being fed through the clamp 6. During the retraction of the carriage a presser 12, actuated by a lever 11, acts on the clamp 6, so that the latter holds the wire fast, and at the same time the pressure of the presser 10 is relaxed, so that the clamp 5 releases its grip on the wire.

A vertically movable cutter 14, actuatable by means of a lever 15 arranged below the table 17, is provided for cutting off the wire projecting from the clamp 6. A similar cutter $14^a$, actuated by a lever $15^a$ above the table, is provided for cutting off the wire projecting from the clamp $6^a$.

On the support 2 there are two holders 3, $3^a$ placed radially at a right angle to each other and adapted to hold the sections of wire 13, $13^a$ (the blanks) cut off by means of the cutters 14 and $14^a$.

The support 2 can be rotated by means of a rack 18 and pinion $18^a$, and is actuated to swing to and fro through an angle of 90 degrees, whereby the holders 3 and $3^a$ are alternately placed opposite the clamps 6 and $6^a$ respectively. When one of the blank-holders is opposite the clamp from which it receives wire, the other holder is opposite a rotatable tubular guide 16, which has holes $16^a$, $16^b$ for entrance of the blanks, and into which a link-former 19 is thrust through a slot $16^c$ so that a semi-circular groove in the face of said link-former is presented to the holder. The link-former is pushed into the slot $16^c$ by a lever 53, against the action of a spring $19^a$.

On the rotatable support 2 there are two reciprocable spring-pressed carriages 20, $20^a$, to which are fixed slender rods 21, $21^a$, arranged so that by advancing the carriages the said rods can be pushed into the holders 3 and $3^a$ respectively, from the rear. The carriages 20, $20^a$ are pushed forward by means of a pusher 24 actuated by means of levers 22, 23, as shown in Fig. 3. When a holder has received a blank, and has been rotated to lie opposite the link-former 19, as shown in Figs. 5 to 8, the respective rod 21 or $21^a$ is pushed through the holder, and pushes the wire blank against the face of the former 19 in the tubular guide 16, so that the wire curls around into the shape of a circular link. The holder $3^a$ is placed at such a level that the wire blank $13^a$ pushed out of it by the rod $21^a$ enters the former 19 at the bottom of the groove, and curls first upward and then downward, so as to produce a ring with a gap at the bottom as shown in Fig. 11. The holder 3 is placed at a higher level, so that the wire blank 13 fed therefrom curls first downward and then upward, producing a ring with a gap at the top, as shown in Fig. 12.

The rings successively produced in the tubular guide 16 are linked together, in the manner illustrated in Figs. 15 to 17, each blank being inserted at a gap 25, and the chain being advanced and turned by means of a rotatable pusher 26, which enters the tubular guide, and the lower end of which is formed to engage the upper end of the chain and adjust each ring, after its formation, so that the next ring produced is linked therewith. The pusher 26 is thrust downward at intervals by a lever 29, against the action of a spring 70, and is rotated by means of two racks 61, 62 engaging a toothed clutch member 28 adapted to coact with a clutch member 31 slidably engaged with the pusher 26 by means of a spline $31^a$. The tubular guide 16 is fixed by a screw $27^a$ to a clutch member 27 adapted to coact with a slidable clutch member 30 which is engaged with the pusher 26 by means of the spline $31^a$.

While the chain is being formed two wires of solder 35, $35^a$ are fed by feed devices 32, $32^a$ to holders 34, $34^a$ mounted on rotatable supports 33, $33^a$. Cutters 40, $40^a$ are provided to cut off sections of solder wire fed to the holders. The holders 34, $34^a$ and the feed devices 32, $32^a$ are constructed, and operate, in exactly the same manner as the holders 3, $3^a$ and feed devices 1, $1^a$, used for supplying the blanks 13, $13^a$ to the guide 16, which has holes $16^d$, $16^e$, but the supports 33, $33^a$ of the holders 34, $34^a$ (on which there are pushers 41, 42, for pushing out the sections of solder) are swung to and fro through 180° between the feed devices 32, $32^a$ and the tube 16, the rotation being effected by means of racks 43, 44, and pinions 45, 46. The sections of solder pushed into the tube 16 are inserted between the links of the chain, so that the latter can be soldered by heating it.

The chain in the tubular guide 16, with the inserted solder, is held together by two wires 36 coiled about it, as shown in Fig. 14, the coiling of these wires 36 taking place while the chain is rotated. When the chain is finished, and has been soldered, the wires 36 are removed.

Instead of using a single link former 19 into which the wire blanks are introduced alternately at top and bottom, there may be two link-formers 50, $50^a$, one above the other, as shown in Figs. 22 to 24, these link-formers being slidable in a bearing 51 which is supported by a coiled spring 54 on a table $17^1$. The bearing 51 is vertically movable, parallel with the tubular guide $16^1$, and is alternately lowered, by a lever 52, and raised, by the spring 54, to place the formers 50 and $50^a$ in position to coact with the blank-holders $3^1$ and $3^2$ respectively. The formers are thrust forward by a lever $53^1$, against the action of springs 55, $55^a$.

The main actuating shaft 56 (Fig. 25) drives two shafts 57, 58, by means of bevel gears, and cams on the shafts 56, 57 and 58 actuate the levers of the several devices hereinbefore described. The shaft 56 also actuates the two rods 73, 74 (Figs. 3, 25, 27), located at the sides of a frame 69, in which are mounted spindles 71, 72, having lever arms 67, 68, which are rotated by means of the rods 73, 74 and impart rotation to suitable eccentrics or cams on the said spindles. These eccentrics or cams actuate the levers 65, 66, of the clutches 30, 31, the said levers being attached to springs 77, 78, which tend to hold the clutches out of engagement.

What we claim as our invention and desire to secure by Letters Patent of the United States is:—

1. Apparatus for producing chains, comprising a link forming device and means for successively pushing wire blanks against said link forming device so that said blanks are bent into annular shape, with the meeting edges alternately at opposite sides of the annuli and means for positioning each link as formed so that the next link when formed will be interlinked therewith.

2. Apparatus for producing chains comprising a rotatable support, two blank-holders on said support, means for feeding wire blanks to said holders, a link former placed so that by shifting said support, said holders can be alternately placed opposite said link former, and means for pushing wire blanks from said holders against said link former so that said links are bent into annular shape, with the meeting edges alternately at opposite sides of the annuli and means for positioning each link as formed so that the next link when formed will be interlinked therewith.

3. Apparatus for producing chains comprising a tubular chain guide, a link former, means for moving said link former into and out of said guide, means for successively pushing wire blanks against said link former so that said blanks are bent into annular shape and interlinked, with the meeting edges alternately at opposite sides of the annuli, two rotatable supports, holders on said supports, means for feeding sections of solder wire to said holders, and means for pushing said sections out of said holders, said rotatable supports being arranged so that by rotation thereof the holders can be swung to and fro between said feeding means and said tubular guide, for the purpose of carrying solder to the links formed in said guide.

4. Apparatus for producing chains comprising a rotatable support, two blank-holders on said support, means for feeding wire blanks to said holders, a link former placed so that by shifting said support, said holders can be alternately placed opposite said link former, means for pushing wire blanks from said holders against said link former so that said links are bent into annular shape and interlinked, with the meeting edges alternately at opposite sides of the annuli, means for moving the interlinked annuli past said link former, and means for rotating the interlinked annuli about the axis of the chain.

In witness whereof we have signed this specification in the presence of two witnesses.

ALBERT HAMM.
KARL DÜRR.

Witnesses:
WM. C. TEICHMANN,
JOSEPH PFEIFFER.

---

Copies of this patent may be obtained for five cents each, by addressing the "Commissioner of Patents, Washington, D. C."